United States Patent
Dai et al.

(10) Patent No.: US 12,042,108 B2
(45) Date of Patent: Jul. 23, 2024

(54) METHOD FOR ROBOT TO JUDGING WHETHER THE ROBOT COLLIDES WITH VIRTUAL WALL, CHIP AND INTELLIGENT ROBOT

(71) Applicant: AMICRO SEMICONDUCTOR CO., LTD., Guangdong (CN)

(72) Inventors: Jianfeng Dai, Guangdong (CN); Qinwei Lai, Guangdong (CN)

(73) Assignee: AMICRO SEMICONDUCTOR CO., LTD., Guangdong (CN)

( * ) Notice: Subject to any disclaimer, the term of this patent is extended or adjusted under 35 U.S.C. 154(b) by 369 days.

(21) Appl. No.: 17/609,005

(22) PCT Filed: Nov. 11, 2019

(86) PCT No.: PCT/CN2019/117255
§ 371 (c)(1),
(2) Date: Nov. 5, 2021

(87) PCT Pub. No.: WO2021/012501
PCT Pub. Date: Jan. 28, 2021

(65) Prior Publication Data
US 2022/0211240 A1 Jul. 7, 2022

(30) Foreign Application Priority Data
Jul. 23, 2019 (CN) .......................... 201910664399.6

(51) Int. Cl.
*G05D 1/00* (2024.01)
*A47L 11/40* (2006.01)
*G06F 3/0488* (2022.01)

(52) U.S. Cl.
CPC ........ *A47L 11/4011* (2013.01); *G05D 1/0044* (2013.01); *G05D 1/0274* (2013.01); *G06F 3/0488* (2013.01); *A47L 2201/04* (2013.01)

(58) Field of Classification Search
CPC ............. A47L 11/4011; A47L 2201/04; G05D 1/0044; G05D 1/0274; G06F 3/0488
See application file for complete search history.

(56) References Cited

U.S. PATENT DOCUMENTS 9,797,247 B1 * 10/2017 Nelson .................... E21F 13/02
2013/0199570 A1 * 8/2013 Lee .......................... A47L 9/009
15/319

(Continued)

FOREIGN PATENT DOCUMENTS

CN   106774294 A    5/2017
CN   106843230 A    6/2017

(Continued)

OTHER PUBLICATIONS

The EESR of patent family EP application No. 199381168.2 issued on May 9, 2022.

(Continued)

*Primary Examiner* — Dale Moyer
(74) *Attorney, Agent, or Firm* — Samson G. Yu (57) ABSTRACT

A method for a robot to judge whether the robot collides with a virtual wall, and a chip and the intelligent robot. The method comprises: providing pre-judgement regions on two sides of a virtual wall, so that when entering the pre-judgement regions, the robot can judge whether the robot collides with the virtual wall by combining a current direction of the robot as well as a relationship between a straight-line distance from the robot to a reference point and a straight-line distance from the reference point to a center point of the virtual wall.

20 Claims, 4 Drawing Sheets

(56) References Cited

U.S. PATENT DOCUMENTS

| | | | |
|---|---|---|---|
| 2016/0214258 A1* | 7/2016 | Yan | B25J 9/163 |
| 2018/0200888 A1* | 7/2018 | Kim | G05D 1/0246 |
| 2018/0373242 A1* | 12/2018 | Han | A47L 9/2852 |
| 2019/0015984 A1* | 1/2019 | Kim | G05D 1/0044 |
| 2019/0015985 A1* | 1/2019 | Kim | B25J 9/1697 |
| 2019/0061157 A1* | 2/2019 | Suvarna | B25J 11/0085 |
| 2019/0197776 A1 | 6/2019 | Kim et al. | |
| 2020/0125087 A1* | 4/2020 | Wu | G05D 1/0238 |

FOREIGN PATENT DOCUMENTS

| | | |
|---|---|---|
| CN | 106997202 A | 8/2017 |
| CN | 108803589 A | 11/2018 |
| CN | 109602341 A | 4/2019 |
| CN | 109947094 A | 6/2019 |
| CN | 110385719 A | 10/2019 |
| EP | 3428762 A1 | 1/2019 |
| EP | 3491906 A1 | 6/2019 |
| JP | 2010061293 A | 3/2010 |
| JP | 2015001450 A | 1/2015 |
| JP | 2016004471 A | 1/2016 |
| JP | 2019071046 A | 5/2019 |
| WO | 2014058161 A1 | 4/2014 |
| WO | 2018196800 A1 | 11/2018 |
| WO | 2019106714 A1 | 6/2019 |

OTHER PUBLICATIONS

The first office action of patent family JP application No. 2022-500753 issued on Feb. 10, 2023.

\* cited by examiner

METHOD FOR ROBOT TO JUDGING WHETHER THE ROBOT COLLIDES WITH VIRTUAL WALL, CHIP AND INTELLIGENT ROBOT

CROSS-REFERENCE TO RELATED APPLICATION

The present disclosure claims priority of Chinese Patent Application No. 201910664399.6, filed to China National Intellectual Property Administration on 11 Nov. 2019 and entitled "Method for Robot to Judge whether the Robot Collides with Virtual Wall, Chip and Intelligent Robot", the disclosure of which is incorporated herein by reference in its entirety.

TECHNICAL FIELD

The disclosure relates to the field of intelligent robots, and in particular to a method for a robot to judge whether the robot collides with a virtual wall, a chip and an intelligent robot.

BACKGROUND

In order to avoid an existing sweeping robot to accidentally enter an area that does not need to be cleaned, a virtual wall emitter is set at an entrance of the area. The virtual wall emitter will generate an infrared signal. While detecting the infrared signal, the robot stops moving forwards and is prevented from entering the area. However, an extra virtual wall emitter needs to be provided, so that hardware cost is increased. At present, a virtual line is drawn at the entrance of the area that does not need to be cleaned in a map constructed by the robot through a mode of setting a virtual wall adopted by some manufacturers. The robot sets a corresponding position as the virtual wall based on a coordinate position of the viral line in the map. While moving to the coordinate position corresponding to the virtual wall, the robot stops moving forwards or turning, thereby realizing the blocking effect. Compared with a virtual wall emitter, this method reduces hardware cost. However, the robot cannot accurately detect the virtual wall because of traveling errors and the like, thereby influencing the blocking effect of the virtual wall.

SUMMARY

A method for a robot to judge whether the robot collides with a virtual wall includes the following steps: a virtual wall is set based on a map constructed by the robot; pre-judging regions are set at two sides of the virtual wall by taking the virtual wall as a center line; whether a current position of the robot is within the pre-judging regions is judged; in a case that the robot is in the pre-judging regions, whether a current direction of the robot faces towards the virtual wall and whether a linear distance between the robot and a control point is greater than or equal to a linear distance between the control point and the center point of the virtual wall are judged, in a case that the current direction of the robot faces towards the virtual wall and the linear distance between the robot and the control point is greater than or equal to the linear distance between the control point and the center point of the virtual wall, the robot is determined to be in collision with the virtual wall, otherwise, the robot is determined to be not in collision with the virtual wall, wherein the control point is a coordinate position point, the coordinate position point and the robot are at the same side of the virtual wall, and a perpendicular distance between the coordinate position point and the center point of the virtual wall is a preset length.

Optionally, setting the virtual wall based on the map constructed by the robot includes the following steps: map information constructed by the robot is received by an intelligent mobile terminal, and the map information is displayed on a screen; a signal of setting the virtual wall is detected by the intelligent mobile terminal, and a touch control signal on the screen is converted into the virtual wall so as to be displayed in the map shown in the screen; the map information with the virtual wall to the robot is transmitted by the intelligent mobile terminal.

Optionally, setting the pre-judging regions at the two sides of the virtual wall by taking the virtual wall as the center line includes the following steps: a slope angle of the virtual wall and coordinates of the center point of the virtual wall are determined; the virtual wall is translated to an origin of a coordinate system by taking the center point as a reference point, and is rotated by the slope angle, so that the virtual wall is on an X axis of the coordinate system; a rectangular area with a preset height is defined as a pre-judging region by taking the virtual wall on the X axis as a center line.

Optionally, judging whether the current position of the robot is in the pre-judging regions includes the following steps: a coordinate point of the current position of the robot is determined; the coordinate point of the current position is translated and rotated corresponding to the virtual wall; whether an X value of the translated and rotated coordinate point is greater than a minimum X value of the pre-judging regions and less a maximum X value of the pre-judging regions, and whether a Y value of the translated and rotated coordinate point is greater than a minimum Y value of the pre-judging regions and less than the maximum Y value of the pre-judging regions are determined; in a case that the X value of the translated and rotated coordinate points is greater than the minimum X value of the pre-judging regions and less than the maximum X value of the pre-judging regions, and the Y value of the translated and rotated coordinate points is greater than the minimum Y value of the pre-judging regions and less than the maximum Y value of the pre-judging regions, the current position of the robot is determined to be in the pre judging regions, otherwise, the current position of the robot is determined to be not in the pre-judging regions.

Optionally, judging whether the current direction of the robot faces towards the virtual wall in case that the robot is in the pre-judging regions includes the following steps: the robot is determined in the pre-judging regions at present; whether a forwarding direction of the robot after translating and rotating is crossed with a virtual wall after translating and rotating is determined, in a case that the forwarding direction of the robot after translating and rotating is crossed with translated and rotated virtual wall, the current direction of the robot is determined towards the virtual wall, otherwise, the current position of the robot is determined not towards the virtual wall.

Optionally, judging whether the linear distance between the robot and the control point is greater than or equal to the linear distance between the control point and the center point of the virtual wall includes the following steps: one side of the virtual wall that the robot is positioned is determined as a reference side; a coordinate position point at the reference side of the virtual wall is determined, as a control point, a perpendicular distance between the control point and the center point of the virtual wall is a preset length; a linear distance between the robot and the control point is determined as a first distance; a linear distance between the control point and the center point of the virtual wall is determined as a second distance; whether the first distance is greater than or equal to the second distance is judged, in a case that the first distance is greater than or equal to the second distance, the linear distance between the robot and the control point is determined to be greater than or equal to the linear distance between the control point and the center point of the virtual wall, otherwise, the linear distance between the robot and the control point is determined to be not greater than or equal to the linear distance between the control point and the center point of the virtual wall.

A chip is configured to store a program instruction, the program instruction is used for controlling a robot to execute the method for judging whether the robot collides with the virtual wall.

An intelligent robot includes a master control chip, the master control chip is the chip above.

DETAILED DESCRIPTION OF THE EMBODIMENTS

The technical solutions in the embodiments of the disclosure will be described clearly and completely in combination with the drawings in the embodiments of the disclosure. It should be understood that the specific embodiments described herein are merely illustrative of the disclosure and are not intended to limit the disclosure. In the detailed description below, numerous specific details are set forth in order to provide a thorough understanding of the embodiments. It will be understood by those skilled in the art, however, that the embodiments can be practiced without these specific details. For example, a circuit can be shown in a block diagram to avoid obscuring the embodiments in unnecessary details. In other instances, well-known circuits, structures, and techniques can not be shown in detail to avid obscuring the embodiments.

Figure 1:
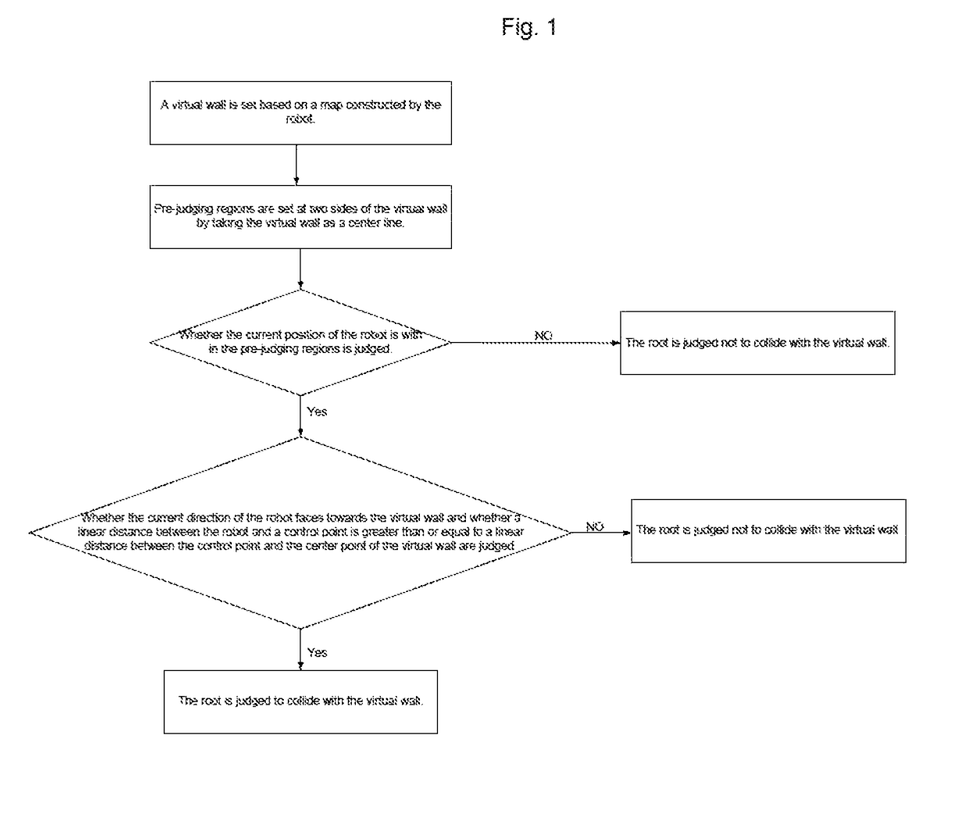
FIG. 1 is a flow chart of a method for judging whether a robot collides with a virtual wall in an embodiment of the disclosure.

In the method for judging whether the robot collides with the virtual wall as shown in FIG. 1, an execution body of the method is a processor or a control chip of the robot which is directly described as a robot for a convenient description. The robot can be a sweeping robot, a scrubbing robot, an air purifying robot, a logistics robot, a weeding robot, a commercial service robot, or the like. The method includes the following steps: firstly, a virtual wall is set based on a map constructed by the robot during self-traveling. The constructed map can be a grid map, a dot matrix map, a color block map or maps of other types, and the constructed map can reflect a current environment in which the robot is located. Each embodiment of the disclosure is described by taking the grid map as an example. The virtual wall can be set by different methods. For example, the robot is controlled to travel once on a position that needs to be provided with the virtual wall, and record coordinate positions and a direction during traveling. The coordinate positions are marked as virtual obstacle units, the virtual obstacle units forming the virtual wall. The virtual obstacle unit refers to a grid unit that the robot travels and passes through in actual, but does not pass through during traveling based on map navigation. Or a user directly operates on a display terminal of the map, and, marks on a corresponding position through a mouse or a touch control mode, the grid unit on the marked position is marked as a grid unit of the virtual wall. The grid unit is a minimum cell which constitutes up a grid map. Pre judging regions are set at two sides of the virtual wall through the robot by taking the virtual wall as a center line, i.e., an area is defined around the virtual wall for pre-judging whether the robot is possible to collide with the virtual wall. Only when the robot enters the pre-judging regions, the robot is possible to collide with the virtual wall. While not in the pre-judging regions, the robot cannot collide with the virtual wall. In a traveling process, the robot detects and judges whether the current position is in the pre-judging regions in real time. When the robot is in the pre judging regions, whether a current direction of the robot faces towards the virtual wall is determined; and meanwhile, whether the linear distance between the robot and the control point is greater than or equal to the linear distance between the control point and the center point of the virtual wall is determined. The current direction of the robot is a current forwarding direction of the robot. The control point is a coordinate position point, the coordinate position point and the robot are at a same side of the virtual wall, and a perpendicular distance between the coordinate position point and the center point of the virtual wall is a preset length. The preset length can be set according to specific development requirements, for example 10 meters, 100 meters or 1000 meters and the like. The greater the set value is, the higher a detection precision of colliding with the virtual wall is. If the current forwarding direction of the robot faces towards the virtual wall, the robot continuously forwards according to the current direction, and is possible to collide with the virtual wall. If the current forwarding direction of the robot does not face towards the virtual wall or is away from the virtual wall, the robot continuously forwards according to the current direction, and does not collide with the virtual wall. When the robot travels towards the virtual wall, the linear distance between the robot and the control point is further detected to be greater than or equal to the linear distance between the control point and the center point of the virtual wall. In such a manner, the robot has been traveled to the position on which the virtual wall is located, has collided with the virtual wall, and needs to immediately stop forwarding and turn away, thereby avoiding passing through the virtual wall to enter an area limited by the user by mistake. When the robot travels towards the virtual wall, the linear distance between the robot and the control point is further detected to be smaller than the linear distance between the control point and the center point of the virtual wall. In such a manner, there is a certain distance between the robot and the virtual wall, and the robot does not collide with the virtual wall, so that the robot can continuously travel in the current direction until the robot collides with the virtual wall. In the method of the embodiment, the pre-judging regions are set at the two sides of the virtual wall, when the robot enters the pre-judging regions, whether the robot collides with the virtual wall can be accurately determined by combining the current direction of the robot as well as a relationship between the linear distance between the robot and the control point and the linear distance between the control point and the center point of the virtual wall without the influences of an external environment, thereby avoiding a misjudging condition and achieving a very high accuracy.

Figure 2:
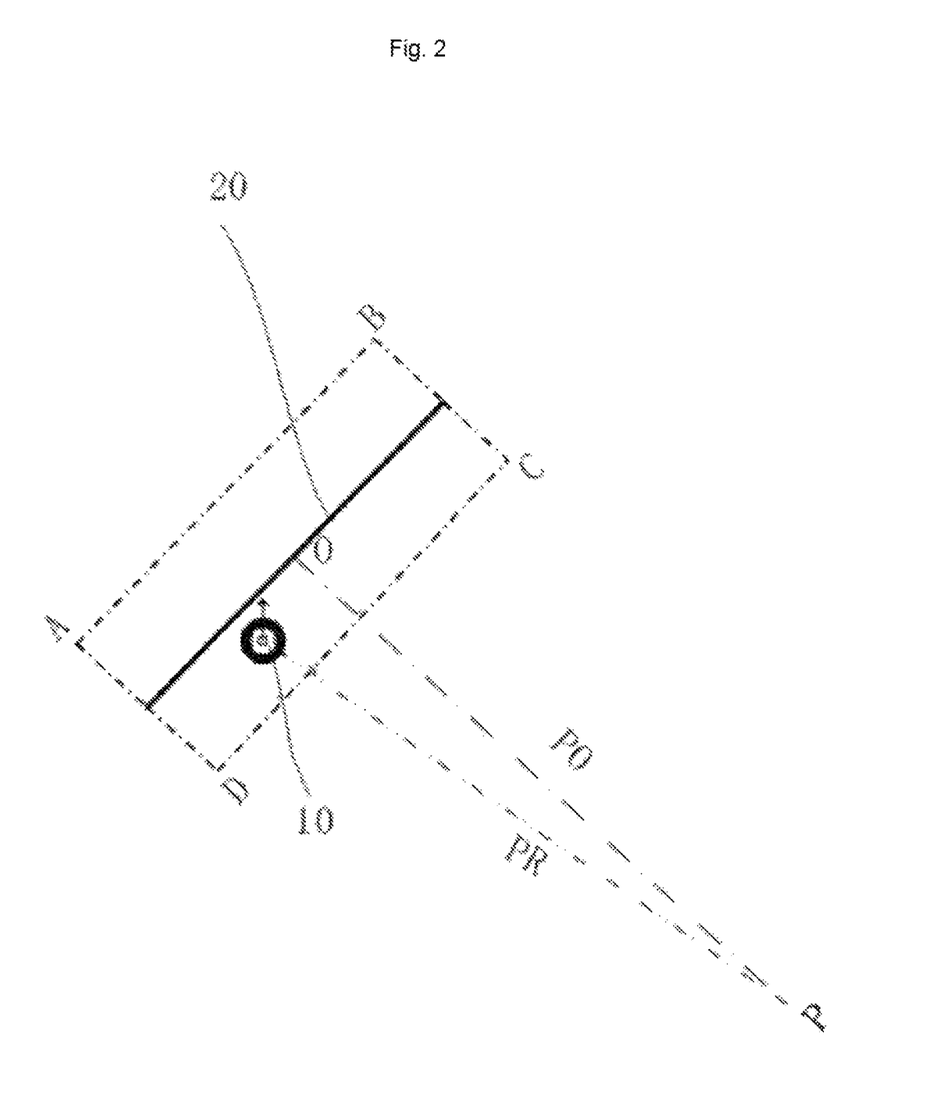
FIG. 2 is an analysis diagram showing that the robot will collide with a virtual wall in an embodiment of the disclosure.
Figure 3:
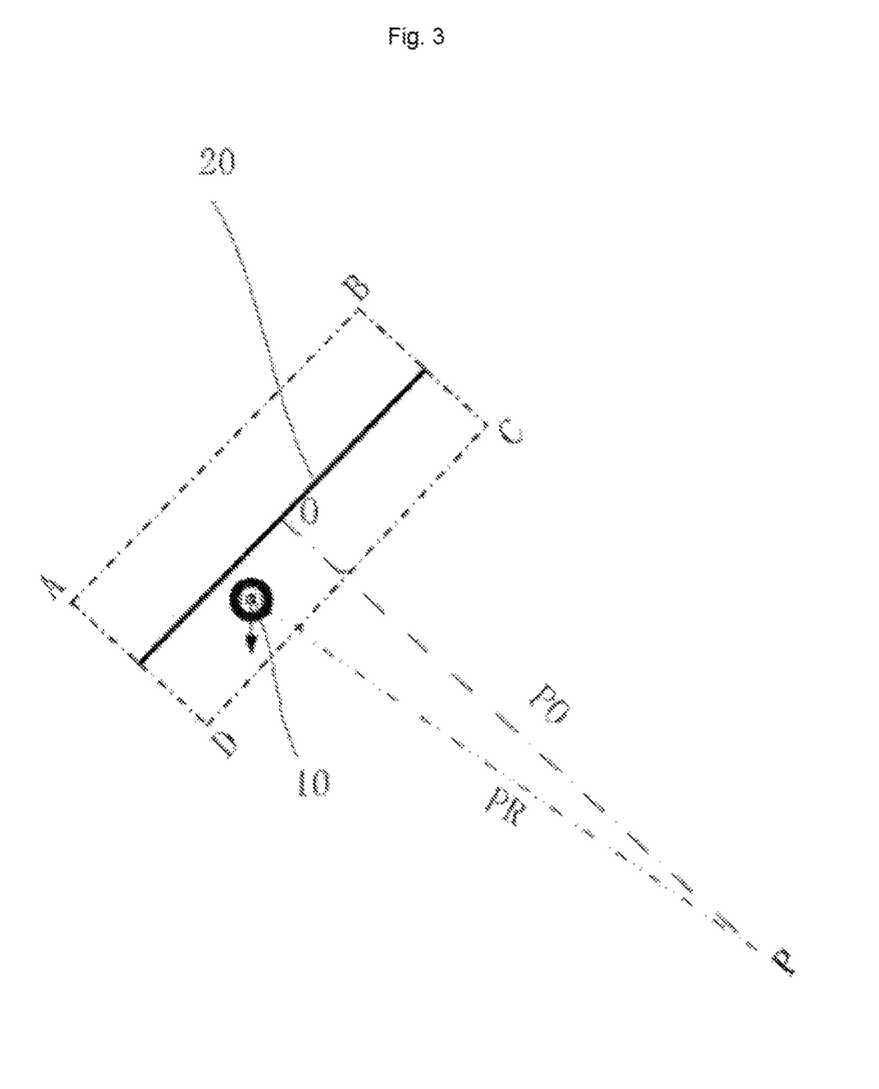
FIG. 3 is an analysis diagram showing that the robot will not collide with a virtual wall in an embodiment of the disclosure.

Specifically, as shown in FIG. 2, a thickest black line is the virtual wall 20, and the point 0 is the center point of the virtual wall 20. A rectangular area shown by ABCD is a pre-judging region. A position point shown by P is a control point, the robot 10 and the control point P are at the right side of the virtual wall 20. The robot 10 is in the pre-judging region ABCD and forwards towards the virtual wall along an arrow direction. During forwarding, the robot judges whether a distance PR between the robot and the control point P is greater than or equal to a distance P0 which is the distance between the point 0 and the control point P. When PR is greater than or equal P0, the robot 10 is determined to collide with the virtual wall 20. When PR is smaller than P0, the robot 10 is determined not to collide with the virtual wall 20. As shown in FIG. 3, if the robot 10 adjusts the forwarding direction to travel in a direction away from the virtual wall 20 indicated by an arrow, the robot does not collide with the virtual wall 20.

As an embodiment, the operation of setting the virtual wall based on the map constructed by the robot includes the following steps. An intelligent mobile terminal receives map information constructed by the robot, and displays the map information on a screen. The intelligent mobile terminal includes intelligent equipment such as a smart mobile phone or a panel computer. The robot and the intelligent terminal are in wireless communication through WiFi. The robot sends the constructed map data in the traveling process to the intelligent terminal, and the intelligent terminal receives the data and displays corresponding map information on a screen thereof. The user can visually see where is a wall, where is a passage, where is a room entrance and the like through the map information. After detecting a signal input by the user of setting the virtual wall, the intelligent terminal enters a mode of setting the virtual wall. In the mode, the intelligent terminal detects a touch signal on the screen of the user, and converts the touch signal on the screen into the virtual wall for being displayed on the shown map. In such a manner, the user can visually see the set virtual wall. The virtual wall is shown as a line segment in the map. After the user sets the virtual wall on a needed position, the intelligent mobile terminal transmits the map information with the virtual wall to the robot. The robot can know which position is set with the virtual wall, and which position cannot be passed by analyzing the map information. In the method of the embodiment, the virtual wall is set by the intelligent terminal, so that the user operates visually and quickly. In such a manner, product use experience of the user is favorably improved.

Figure 4:
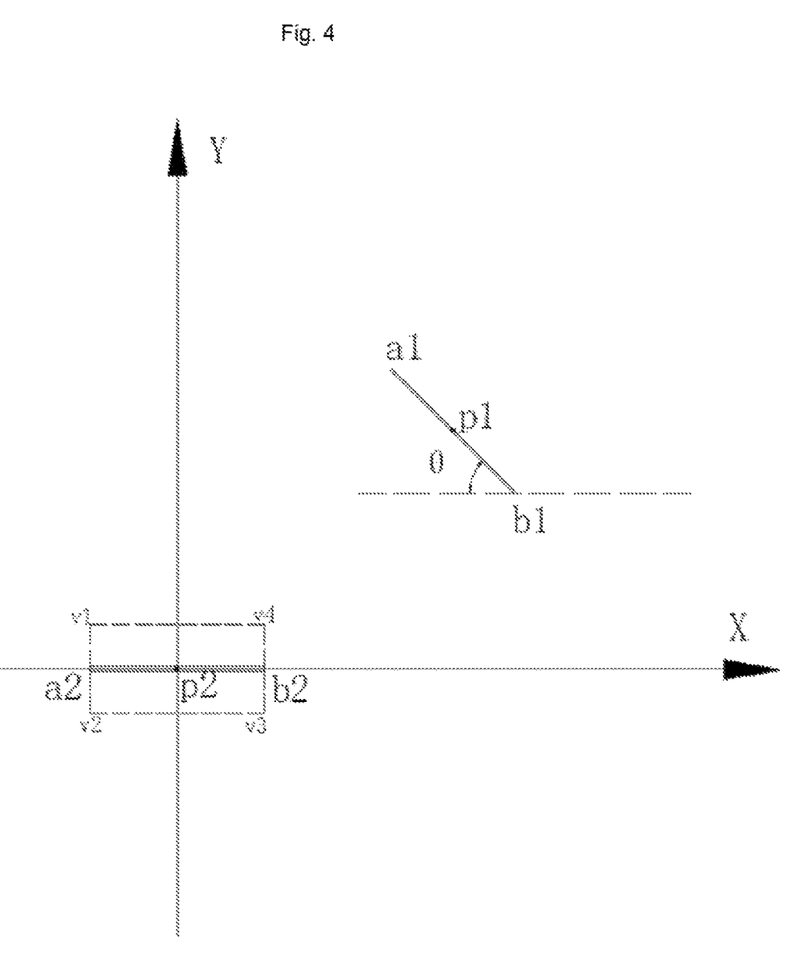
FIG. 4 is an analysis diagram showing that the virtual wall is translated and rotated in, an embodiment of the disclosure.

As an embodiment, the virtual wall is a center line, setting the pre-judging regions at the two sides of the virtual wall includes the following steps. The robot firstly determines a slope angle of the virtual wall and coordinates of a center point of the virtual wall. As shown in FIG. 4, an XY coordinate system is a coordinate system of the map, and a line segment a1b1 represents the virtual wall set in the map. A slope angle of the virtual wall a1b1 is a and an included angle between the virtual wall and the X axis. A coordinate of a center point pi of the virtual wall a1b1 is (px1, py1), a coordinate of a point a1 is (ax1, ay1), and a coordinate of a point b1 is (bx1, by1). The robot translates a reference point of the virtual wall which is a center point of the virtual wall to an origin of the coordinate system, and rotates the virtual wall by the slope angle, so that the virtual wall is on the X axis of the coordinate system, shown by a line section a2b2 in the figure. If coordinates of each point of the virtual wall are changed, the point a1 is changed into a point a2 with the coordinates being changed to (ax2, ay2), the point b1 is changed into a point b2 with coordinates being changed to (bx2, by2), and the point p1 is changed into a point p2 with coordinates being changed into (px2, py2). Translation and rotation of the coordinates of the virtual wall can be calculated by reference to an existing coordinate translation and rotation formula, which is not described again herein. Then, the robot defines a rectangular area with a preset height as a pre-judging region by taking the virtual wall on the X axis as a center line. The preset height can be correspondingly set according to development and design requirements, which is generally set to be the height of ten grid units. In FIG. 4, an area marked by a virtual line frame v1v2v3v4 is a pre-judging region. In the method of the embodiment, the virtual wall can be translated and rotated onto a coordinate axis to simplify subsequent calculation of judging whether the robot enters the pre-judging regions, thereby improving operation efficiency of the robot, increasing determining speed of the robot, and improving reaction ability of the robot.

As an embodiment, determining whether the current position of the robot is in the pre-judging regions includes the following steps. A coordinate point of the current position is determined by the robot. The robot translates and rotates the coordinate point of the current position corresponding to the virtual wall, i.e., translation amount and a rotation angle of the current coordinate point of the robot is the same with translation amount and the rotation angle of the virtual wall in the last embodiment. Specific coordinate translation and rotation can be calculated with reference to an existing coordinate translation and rotation formula, which is not described again herein. Whether an X value of the translated and rotated coordinate points is greater than a minimum X value of the pre-judging regions and less than a maximum X value of the pre-judging regions is determined, in a case that the X value of the translated and rotated coordinate points is greater than the minimum X value of the pre-judging regions and less than the maximum X value of the pre-judging regions, the robot is within a X-axis coordinate range of the pre-judging regions. Whether a Y value of the translated and rotated coordinate points is greater than a minimum Y value of the pre judging regions and less than a maximum Y value of the pre-judging regions is determined, in a case that the Y value of the translated and rotated coordinate points is greater than the minimum Y value of the pre judging regions and less than a maximum Y value of the pre-judging regions, the robot is within a Y-axis coordinate range of the pre-judging regions. In such a manner, the current position of the robot can be determined to be in the pre-judging regions. Otherwise, the current position of the robot can be determined to be not in the pre-judging regions. In the method of the embodiment, the current coordinates of the robot are translated and rotated into a coordinate system corresponding to the virtual wall, so that only by determining whether an X value and a Y value are within the XY range of the pre-judging regions, whether the robot is in the pre-judging regions can be determined sequentially without complex comparison and analysis, thereby greatly simplifying calculating resources of the robot, improving calculation efficiency of the robot, increasing determining speed of the robot, and improving reaction ability of the robot.

As an embodiment, judging whether the current direction of the robot faces towards the virtual wall when the robot is in the pre-judging regions includes the following steps. The robot is determined in the pre-judging regions at present through the method in the last embodiment, the robot determines whether a forwarding direction after translating and rotating is crossed with a virtual wall after translating and rotating, i.e., the robot determines whether a coordinate point passed through by a straight line corresponding to the forwarding direction is the same with a coordinate point in the virtual wall from the current position of the robot. If the coordinate point passed through by the straight line corresponding to the forwarding direction is the same with the coordinate point in the virtual wall from the current position of the robot, the current direction of the robot is crossed with the virtual wall, and the current direction of the robot is determined to face towards the virtual wall. If the coordinate point passed through by the straight line corresponding to the forwarding direction is different from the coordinate point in the virtual wall from the current position of the robot, the current direction of the robot is determined not to face towards the virtual wall. In the method of the embodiment, whether the forwarding direction determined by translating and rotating the current position of the robot is crossed with the virtual wall is determined, so that judgment conclusion can be quickly obtained without complex calculation, thereby greatly improving data processing and straining ability of the robot.

As an embodiment, judging whether the linear distance between the robot and the control point is greater than or equal to the linear distance between the control point and the center point of the virtual wall includes the following steps. One side of the virtual wall 20 that the robot 10 is positioned is determined as a reference side. As shown in FIG. 2, the robot 10 is at the right side of the virtual wall 20, and the right side of the virtual wall 20 is a reference side. As for the method that the robot 10 judges which side of the virtual wall 20 is located, the robot judges distances between the robot and two reference points by setting the reference points at the same distance on both sides of the virtual wall as a line of symmetry in the map. The robot is located as the side on which the reference point with a smaller distance from the robot is located. Certainly, the control point can be a reference point. The robot 10 determines that a coordinate position point at the reference side of the virtual wall 20 is determined as a control point, a perpendicular distance between the control point and the center point of the virtual wall 20 is a preset length. In the figure, a length P0 of a linear distance between a point P and a point 0 is preset length, and the value of the P0 can be correspondingly set according to product design requirements. The greater the set value, is, the higher the precision of determining whether the robot collides with the virtual wall is, generally the set value can be set as length of 1000 grid units. The robot 10 determines a linear distance between the current position and the control point P as a first distance PR. The robot determines a linear distance between the control point P and the center point of the virtual wall 20 as a second distance P0. The robot 10 determines whether the first distance PR is greater than or equal to the second distance P0. If PR is greater than or equal to P0, the linear distance between the robot and the control point is determined to be greater than or equal to the linear distance between the control point and the center point of the virtual wall. If PR is less than P0, the linear distance between the robot and the control point is determined to be not greater than or equal to the linear distance between the control point and the center point of the virtual wall. In the method of the embodiment, the control point can be set for precisely judging whether the robot travels to a boundary of the virtual wall, thereby overcoming the problem that the distance between the robot and the virtual wall is too large or the robot directly passes through the virtual wall as a current robot cannot accurately travel to the boundary of the virtual wall, and guaranteeing the optimal distance control between the robot and the virtual wall.

A chip is configured to store a program instruction, the program instruction is used for controlling the robot in any embodiment to execute the method for the robot to judge whether the robot collides with a virtual wall. The chip can control the robot to set pre-judging regions at two sides of the virtual wall, when the robot enters the pre-judging regions, whether the robot collides with the virtual wall can be accurately determined by combining the current direction of the robot as well as a relationship between the linear distance between the robot and the control point and the linear distance between the control point and the center point of the virtual wall without the influences of an external environment, thereby avoiding a mis-judging condition and achieving a very high accuracy.

An intelligent robot includes a master control chip, the master control chip is the chip above. The robot sets pre-judging regions at two sides of the virtual wall, when the robot enters the pre-judging regions, whether the robot collides with the virtual wall can be accurately determined by combining the current direction of the robot as well as a relationship between the linear distance between the robot and the control point and the linear distance between the control point and the center point of the virtual wall without the influences of an external environment, thereby avoiding a misjudging condition and achieving a very high accuracy.

The words "upper", "lower", "left", and "right" mentioned in the above embodiments, unless otherwise specified, refer to the directions of up, down, left, and right in the drawings. If there is a specific description, it is defined that, for example, the left side of the robot refers to the left side of the forwarding direction of the robot, instead of the left side in the drawings.

Those of ordinary skill in the art can understand that that all or part of the steps in the various method embodiments can be accomplished by hardware associated with the program instructions. These programs can be stored in a computer readable storage medium (various media such as ROM, RAM, disk or optical disc that can store program codes). The program, when executed, executes the steps including the various method embodiments described above. Finally, it should be noted that the above embodiments are only used to illustrate the technical solutions of the disclosure and shall not be construed as limitation. Although the disclosure has been described in detail with reference to the foregoing embodiments, those of ordinary skill in the art should understand that modifications or equivalent substitutions can be made on the technical solutions recorded in the embodiments or part of all technical features herein, all of which do not deviate the technical solutions from the scope of the technical solutions embodied in the embodiments of the disclosure.

What is claimed is:

1. A method for a robot to judge whether the robot collides with a virtual wall, comprising:
   setting a virtual wall based on a map constructed by the robot;
   setting pre-judging regions at two sides of the virtual wall by taking the virtual wall as a center line;
   judging whether a current position of the robot is within the pre-judging regions;
   in a case that the robot is in the pre-judging regions, judging whether a current direction of the robot faces towards the virtual wall, and whether a linear distance between the robot and a control point is greater than or equal to a linear distance between the control point and a center point of the virtual wall, in a case that the current direction of the robot faces towards the virtual wall and the linear distance between the robot and the control point is greater than or equal to the linear distance between the control point and the center point of the virtual wall, determining the robot to be in collision with the virtual wall, otherwise, determining the robot to be not in collision with the virtual wall, wherein the control point and the robot are at a same side of the virtual wall, and a perpendicular distance between the control point and the center point of the virtual wall is a preset length.

2. The method according to claim 1, wherein setting the virtual wall based on the map constructed by the robot comprises:

receiving map information constructed by the robot by an intelligent mobile terminal, and displaying the map information on a screen;

detecting a signal of setting the virtual wall by the intelligent mobile terminal, and converting a touch control signal on the screen into the virtual wall so as to be displayed in the map shown in the screen; and transmitting the map information with the virtual wall to the robot by the intelligent mobile terminal.

3. The method according to claim 2, wherein judging whether the current position of the robot is in the pre-judging regions comprises:

determining a coordinate point of the current position of the robot;

translating and rotating the coordinate point of the current position corresponding to the virtual wall;

judging whether an X value of translated and rotated coordinate points is greater than a minimum X value of the pre-judging regions and less than a maximum X value of the pre-judging regions, and judging whether a Y value of the translated and rotated coordinate points is greater than a minimum Y value of the pre-judging regions and less than a maximum Y value of the pre-judging regions;

in a case that the X value of the translated and rotated coordinate points is greater than the minimum X value of the pre-judging regions and less than the maximum X value of the pre-judging regions, and the Y value of the translated and rotated coordinate points is greater than the minimum Y value of the pre-judging regions and less than the maximum Y value of the pre-judging regions, determining the current position of the robot to be in the pre-judging regions, otherwise, determining the current position of the robot to be not in the pre-judging regions.

4. The method according to claim 3, wherein judging whether the current direction of the robot faces towards the virtual wall in case that the robot is in the pre-judging regions comprises:

determining the robot in the pre-judging regions at present;

determining whether a forwarding direction of the robot after translating and rotating is crossed with a virtual wall after translating and rotating, in a case that the forwarding direction of the robot after translating and rotating is crossed with translated and rotated virtual wall, determining the current direction of the robot towards the virtual wall, otherwise, determining the current direction of the robot not towards the virtual wall.

5. The method according to claim 1, wherein setting the pre-judging regions at the two sides of the virtual wall by taking the virtual wall as the center line comprises:

determining a slope angle of the virtual wall and coordinates of the center point of the virtual wall;

translating the center point of the virtual wall to an origin of a coordinate system by taking the center point the virtual wall as a reference point, and rotating by the slope angle, so that the virtual wall is on an X axis of the coordinate system; and defining a rectangular area with a preset height as a pre-judging region by taking the virtual wall on the X axis as a center line.

6. The method according to claim 5, wherein judging whether the current position of the robot is in the pre-judging regions comprises:

determining a coordinate point of the current position of the robot;

translating and rotating the coordinate point of the current position corresponding to the virtual wall;

judging whether an X value of translated and rotated coordinate points is greater than a minimum X value of the pre-judging regions and less than a maximum X value of the pre-judging regions, and judging whether a Y value of the translated and rotated coordinate points is greater than a minimum Y value of the pre-judging regions and less than a maximum Y value of the pre-judging regions;

in a case that the X value of the translated and rotated coordinate points is greater than the minimum X value of the pre-judging regions and less than the maximum X value of the pre-judging regions, and the Y value of the translated and rotated coordinate points is greater than the minimum Y value of the pre-judging regions and less than the maximum Y value of the pre-judging regions, determining the current position of the robot to be in the pre-judging regions, otherwise, determining the current position of the robot to be not in the pre-judging regions.

7. The method according to claim 6, wherein judging whether the current direction of the robot faces towards the virtual wall in case that the robot is in the pre-judging regions comprises:

determining the robot in the pre-judging regions at present;

determining whether a forwarding direction of the robot after translating and rotating is crossed with a virtual wall after translating and rotating, in a case that the forwarding direction of the robot after translating and rotating is crossed with translated and rotated virtual wall, determining the current direction of the robot towards the virtual wall, otherwise, determining the current direction of the robot not towards the virtual wall.

8. The method according to claim 1, wherein judging whether the current position of the robot is in the pre-judging regions comprises:

determining a coordinate point of the current position of the robot;

translating and rotating the coordinate point of the current position corresponding to the virtual wall;

judging whether an X value of translated and rotated coordinate points is greater than a minimum X value of the pre-judging regions and less than a maximum X value of the pre-judging regions, and judging whether a Y value of the translated and rotated coordinate points is greater than a minimum Y value of the pre-judging regions and less than a maximum Y value of the pre-judging regions;
in a case that the X value of the translated and rotated coordinate points is greater than the minimum X value of the pre-judging regions and less than the maximum X value of the pre-judging regions, and the Y value of the translated and rotated coordinate points is greater than the minimum Y value of the pre-judging regions and less than the maximum Y value of the pre-judging regions, determining the current position of the robot to be in the pre-judging regions, otherwise, determining the current position of the robot to be not in the pre-judging regions.

9. The method according to claim 8, wherein judging whether the current direction of the robot faces towards the virtual wall in case that the robot is in the pre-judging regions comprises:
determining the robot in the pre-judging regions at present;
determining whether a forwarding direction of the robot after translating and rotating is crossed with a virtual wall after translating and rotating, in a case that the forwarding direction of the robot after translating and rotating is crossed with translated and rotated virtual wall, determining the current direction of the robot towards the virtual wall, otherwise, determining the current direction of the robot not towards the virtual wall.

10. The method according to claim 5, wherein judging whether the linear distance between the robot and the control point is greater than or equal to the linear distance between the control point and the center point of the virtual wall comprises:
determining one side of the virtual wall that the robot is positioned as a reference side;
determining a coordinate position point at the reference side of the virtual wall as a control point, a perpendicular distance between the control point and the center point of the virtual wall is a preset length;
determining a linear distance between the robot and the control point as a first distance;
determining a linear distance between the control point and the center point of the virtual wall as a second distance;
judging whether the first distance is greater than or equal to the second distance, in a case that the first distance is greater than or equal to the second distance, determining the linear distance between the robot and the control point to be greater than or equal to the linear distance between the control point and the center point of the virtual wall, otherwise, determining the linear distance between the robot and the control point to be not greater than or equal to the linear distance between the control point and the center point of the virtual wall.

11. A non-volatile storage chip, configured to store a program instruction, wherein the program instruction is used for controlling a robot to execute the method for judging whether the robot collides with the virtual wall, wherein the method for judging whether the robot collides with the virtual wall. comprises:
setting a virtual wall based on a map constructed by the robot;
setting pre-judging regions at two sides of the virtual wall by taking the virtual wall as a center line;
judging whether a current position of the robot is within the pre-judging regions;
in a case that the robot is in the pre-judging regions, judging whether a current direction of the robot faces towards the virtual wall, and whether a linear distance between the robot and a control point is greater than or equal to a linear distance between the control point and a center point of the virtual wall, in a case that the current direction of the robot faces towards the virtual wall and the linear distance between the robot and the control point is greater than or equal to the linear distance between the control point and the center point of the virtual wall, determining the robot to be in collision with the virtual wall, otherwise, determining the robot to be not in collision with the virtual wall,
wherein the control point and the robot are at a same side of the virtual wall, and a perpendicular distance between the control point and the center point of the virtual wall is a preset length.

12. An intelligent robot, comprising a master control chip, wherein the master control chip is the chip of claim 11.

13. The method according to claim 11, wherein setting the virtual wall based on the map constructed by the robot comprises:
receiving map information constructed by the robot by an intelligent mobile terminal, and displaying the map information on a screen;
detecting a signal of setting the virtual wall by the intelligent mobile terminal, and converting a touch control signal on the screen into the virtual wall so as to be displayed in the map shown in the screen; and
transmitting the map information with the virtual wall to the robot by the intelligent mobile terminal.

14. The method according to claim 13, wherein judging whether the current position of the robot is in the pre-judging regions comprises:
determining a coordinate point of the current position of the robot;
translating and rotating the coordinate point of the current position corresponding to the virtual wall;
judging whether an X value of translated and rotated coordinate points is greater than a minimum X value of the pre-judging regions and less than a maximum X value of the pre-judging regions, and judging whether a Y value of the translated and rotated coordinate points is greater than a minimum Y value of the pre-judging regions and less than a maximum Y value of the pre-judging regions;
in a case that the X value of the translated and rotated coordinate points is greater than the minimum X value of the pre-judging regions and less than the maximum X value of the pre-judging regions, and the Y value of the translated and rotated coordinate points is greater than the minimum Y value of the pre-judging regions and less than the maximum Y value of the pre-judging regions, determining the current position of the robot to be in the pre-judging regions, otherwise, determining the current position of the robot to be not in the pre-judging regions.

15. The method according to claim 14, wherein judging whether the current direction of the robot faces towards the virtual wall in case that the robot is in the pre-judging regions comprises;
determining the robot in the pre-judging regions at present;
determining whether a forwarding direction of the robot after translating and rotating is crossed with a virtual wall after translating and rotating, in a case that the forwarding direction of the robot after translating and rotating is crossed with translated and rotated virtual wall, determining the current direction of the robot towards the virtual wall, otherwise, determining the current direction of the robot not towards the virtual wall.

16. The method according to claim 11, wherein setting the pre-judging regions at the two sides of the virtual wall by taking the virtual wall as the center line comprises:

determining a slope angle of the virtual wall and coordinates of the center point of the virtual wall;

translating the center point of the virtual wall to an origin of a coordinate system by taking the center point the virtual wall as a reference point, and rotating by the slope angle, so that the virtual wall is on an X axis of the coordinate system; and defining a rectangular area with a preset height as a pre-judging region by taking the virtual wall on the X axis as a center line.

17. The method according to claim 16, wherein judging whether the current position of the robot is in the pre-judging regions comprises;

determining a coordinate point of the current position of the robot;

translating and rotating the coordinate point of the current position corresponding to the virtual wall;

judging whether an X value of translated and rotated coordinate points is greater than a minimum X value of the pre-judging regions and less than a maximum X value of the pre-judging regions, and judging whether a Y value of the translated and rotated coordinate points is greater than a minimum Y value of the pre-judging regions and less than a maximum Y value of the pre-judging regions;

in a case that the X value of the translated and rotated coordinate points is greater than the minimum X value of the pre-judging regions and less than the maximum X value of the pre-judging regions, and the Y value of the translated and rotated coordinate points is greater than the minimum Y value of the pre-judging regions and less than the maximum Y value of the pre-judging regions, determining the current position of the robot to be in the pre-judging regions, otherwise, determining the current position of the robot to be not in the pre-judging regions.

18. The method according to claim 11, wherein judging whether the current position of the robot is in the pre-judging regions comprises:

determining a coordinate point of the current position of the robot;

translating and rotating the coordinate point of the current position corresponding to the virtual wall;

judging whether an X value of translated and rotated coordinate points is greater than a minimum X value of the pre-judging regions and less than a maximum X value of the pre-judging regions, and judging whether a Y value of the translated and rotated coordinate points is greater than a minimum Y value of the pre-judging regions and less than a maximum Y value of the pre-judging regions;

in a case that the X value of the translated and rotated coordinate points is greater than the minimum X value of the pre-judging regions and less than the maximum X value of the pre-judging regions, and the Y value of the translated and rotated coordinate points is greater than the minimum Y value of the pre-judging regions and less than the maximum Y value of the pre-judging regions, determining the current position of the robot to be in the pre-judging regions, otherwise, determining the current position of the robot to be not in the pre-judging regions.

19. The method according to claim 18, wherein judging whether the current direction of the robot faces towards the virtual wall in case that the robot is in the pre-judging regions comprises:

determining the robot in the pre-judging regions at present;

determining whether a forwarding direction of the robot after translating and rotating is crossed with a virtual wall after translating and rotating, in a case that the forwarding direction of the robot after translating and rotating is crossed with translated and rotated virtual wall, determining the current direction of the robot towards the virtual wall, otherwise, determining the current direction of the robot not towards the virtual wall.

20. The method according to claim 19, wherein judging whether the linear distance between the robot and the control point is greater than or equal to the linear distance between the control point and the center point of the virtual wall comprises:

determining one side of the virtual wall that the robot is positioned as a reference side;

determining a coordinate position point at the reference side of the virtual wall as a control point, a perpendicular distance between the control point and the center point of the virtual wall is a preset length;

determining a linear distance between the robot and the control point as a first distance;

determining a linear distance between the control point and the center point of the virtual. wall as a second distance;

judging whether the first distance is greater than or equal to the second distance, in a case that the first distance is greater than or equal to the second distance, determining the linear distance between the robot and the control point to be greater than or equal to the linear distance between the control point and the center point of the virtual wall, otherwise, determining the linear distance between the robot and the control point to be not greater than or equal to the linear distance between the control point and the center point of the virtual wall.

* * * * *